United States Patent
Amemiya

(10) Patent No.: US 12,011,823 B2
(45) Date of Patent: Jun. 18, 2024

(54) LINEAR MOTION MECHANISM

(71) Applicant: FANUC CORPORATION, Yamanashi (JP)

(72) Inventor: Wataru Amemiya, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 18/015,091

(22) PCT Filed: Jul. 14, 2021

(86) PCT No.: PCT/JP2021/026486
§ 371 (c)(1),
(2) Date: Jan. 9, 2023

(87) PCT Pub. No.: WO2022/019195
PCT Pub. Date: Jan. 27, 2022

(65) Prior Publication Data
US 2023/0249365 A1    Aug. 10, 2023

(30) Foreign Application Priority Data
Jul. 21, 2020    (JP) .................................. 2020-124229

(51) Int. Cl.
*B25J 18/02*    (2006.01)
*B25J 9/12*     (2006.01)
(Continued)

(52) U.S. Cl.
CPC .............. *B25J 18/025* (2013.01); *B25J 9/126* (2013.01); *B25J 19/0025* (2013.01); *B25J 9/102* (2013.01); *H02G 11/02* (2013.01)

(58) Field of Classification Search
CPC ... B25J 18/02; B25J 9/102; B25J 9/023; B25J 9/0093; B25J 9/041; B25J 9/10;
(Continued)

(56) References Cited

U.S. PATENT DOCUMENTS 8,925,405 B2     1/2015  Kawabuchi et al.
2009/0101407 A1  4/2009  Yamamoto
(Continued)

FOREIGN PATENT DOCUMENTS

EP      526120 A1  *  2/1993  .............. B25J 18/06
JP      S62-148186 A    7/1987
(Continued)

OTHER PUBLICATIONS

International Search Report issued in PCT/JP2021/026486 mailed on Oct. 5, 2021 with English Translation (7 pages).
(Continued)

*Primary Examiner* — T. Scott Fix
(74) *Attorney, Agent, or Firm* — Nakanishi IP Associates, LLC

(57) ABSTRACT

A linear motion mechanism has a plurality of linear motion elements assembled telescopically in multiple stages, and a block row connected to the linear motion elements and configured to drive the linear motion elements. A drive mechanism feeds the block row from an accommodating portion to extend the linear motion elements and pulls back the block row to the housing to contract the linear motion elements. The wire body is wired along the block row. A detour member is provided to absorb the excess length of the wire body which varies as the block row is fed and pulled back.

7 Claims, 8 Drawing Sheets

(51) Int. Cl.
  *B25J 19/00*   (2006.01)
  *B25J 9/10*    (2006.01)
  *H02G 11/02*   (2006.01)

(58) Field of Classification Search
  CPC .......... B25J 9/104; F16G 13/20; F16G 13/18;
          F16G 13/22; F16G 13/24; F16G 13/02;
          F16G 13/04; F16G 13/08; F16G 13/14;
          F16G 15/04; F16G 15/06; F16G 15/12;
          F16G 15/14; F22B 37/483; F28G 15/04
  USPC .......... 74/490.01, 665 GE, 89.2, 37; 174/69;
          138/120; 474/202, 204, 205, 206; 254/1,
                                254/311; 52/108
  See application file for complete search history.

(56) References Cited

U.S. PATENT DOCUMENTS

| | | | |
|---|---|---|---|
| 2012/0024091 A1 | 2/2012 | Kawabuchi et al. | |
| 2019/0145498 A1* | 5/2019 | Yoon | F16H 19/0663 74/490.04 |
| 2020/0238506 A1* | 7/2020 | Keyes | B25J 9/104 |
| 2020/0353630 A1 | 11/2020 | Roulet-Dubonnet et al. | |

FOREIGN PATENT DOCUMENTS

| | | | |
|---|---|---|---|
| JP | S62-241692 A | 10/1987 | |
| JP | S64-056982 U1 | 4/1989 | |
| JP | H07-116986 A | 5/1995 | |
| JP | H11-106191 A | 4/1999 | |
| JP | 2008-067563 A | 3/2008 | |
| JP | 2009-100563 A | 5/2009 | |
| JP | 2012-085414 A | 4/2012 | |
| JP | 2013-055808 A | 3/2013 | |
| JP | 5317362 B2 | 10/2013 | |
| WO | WO-2018216761 A1 * | 11/2018 | .......... B25J 15/0028 |
| WO | 2019/110724 A1 | 6/2019 | |

OTHER PUBLICATIONS

Written Opinion of the International Searching Authority issued in PCT/JP2021/026486 mailed on Oct. 5, 2021 with English Translation (8 pages).

* cited by examiner

LINEAR MOTION MECHANISM

TECHNICAL FIELD

Embodiments described herein relate generally to a linear motion mechanism.

BACKGROUND

A linear motion mechanism is an effective mechanism for improving the safety of a robot device because it can eliminate the need for an elbow joint of the robotic device. The linear motion mechanism is expected to be applied to collaborative robots which can work in collaboration with humans. As the linear motion mechanism, there is known a structure in which an arm part as a columnar body is configured by joining a first frame row of a plurality of first frames (flat plates) coupled bendably by a rotary shaft and a second frame row of a plurality of second frames (blocks) similarly coupled bendably, and the first and second frame rows are separated and accommodated in a support portion as bendable row bodies (Patent Literature 1).

An end effector or a wrist part to which the end effector is connected is provided at the tip of the arm part which constitutes the linear motion mechanism. A wire body including a cable for driving a motor and a tube for supplying air is routed along the arm part. Therefore, the wiring route of the wire body changes in conjunction with the motion of the arm part. When the wiring route length of the wire body varies as the wiring route of the wire body changes, an excess length of the wire body occurs. The excess length of the wire body appears as slack of the wire body. The slack of the wire body wired inside the arm part causes interference with peripheral components of the wiring route of the wire body. One way to avoid this is to increase the size of the linear motion mechanism and increase the internal space so that the components can be placed away from the wiring route of the wire body. Further, when the wire body is routed outside the arm part, the slack of the wire body causes interference with peripheral devices of the robot. One way to avoid this is to increase the size of the entire system so that peripheral devices can be placed away from the robot.

CITATION LIST

Patent Literature

Patent Literature 1: Japanese Patent No. 5317362

DETAILED DESCRIPTION

Figure 1:
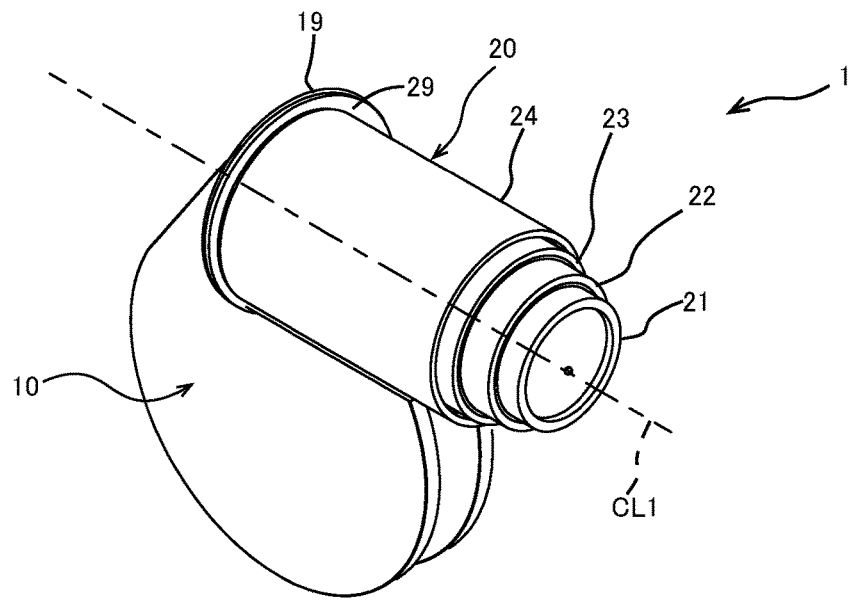
FIG. 1 is a perspective view of a linear motion mechanism during contraction according to an embodiment.

A linear motion mechanism according to one aspect of the present disclosure includes: a plurality of linear motion elements assembled telescopically in multiple stages; and a block row including a plurality of blocks bendably coupled in a row and connected to the linear motion elements. An accommodating portion accommodates the block row. A wire body is wired along the block row. A drive mechanism feeds the block row from the accommodating portion to extend the linear motion elements and pulls the block row back to the housing to contract the linear motion elements. A detour member absorbs the excess length of the wire body which varies as the block row is fed and pulled back.

Hereinafter, a linear motion mechanism according to the present embodiment will be described with reference to the drawings. The linear motion mechanism according to the present embodiment can be used alone or as a linear motion joint of a robot arm mechanism. In the following description, constituent elements having substantially the same function and configuration are denoted by the same reference numeral, and a repetitive description will be given only where necessary.

Figure 2:
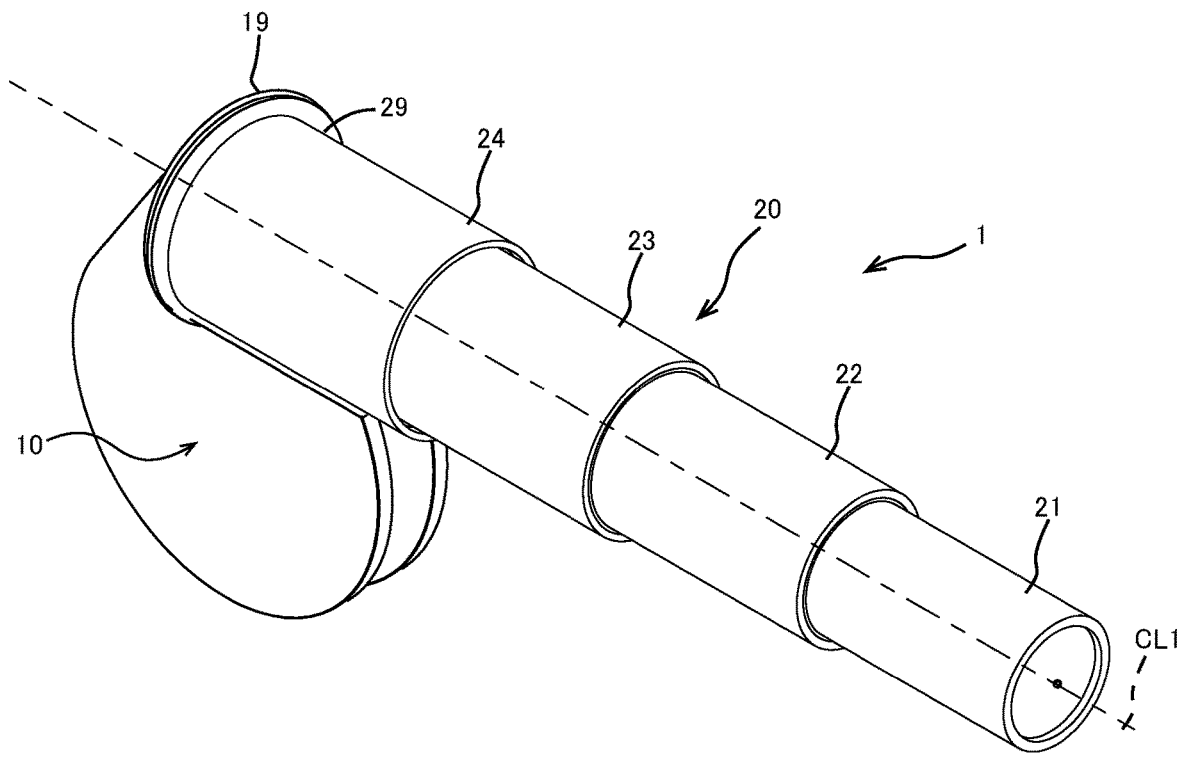
FIG. 2 is a perspective view of the linear motion mechanism during extension.

As shown in FIGS. 1 and 2, a linear motion mechanism 1 has a telescopic linear motion arm 20. Typically, the linear motion arm 20 is composed of a plurality of linear motion elements assembled in multiple stages. In the present embodiment, the linear motion arm 20 is composed of four linear motion elements (hereinafter referred to as cylinders) 21, 22, 23, 24 assembled in a telescopic structure (multi-stage nested structure). Typically, the cylinders 21, 22, 23, 24 are circular cylinders. The cylinders 21, 22, 23, 24 may be squire cylinders. The linear motion arm 20 is supported by a housing 10.

Figure 3:
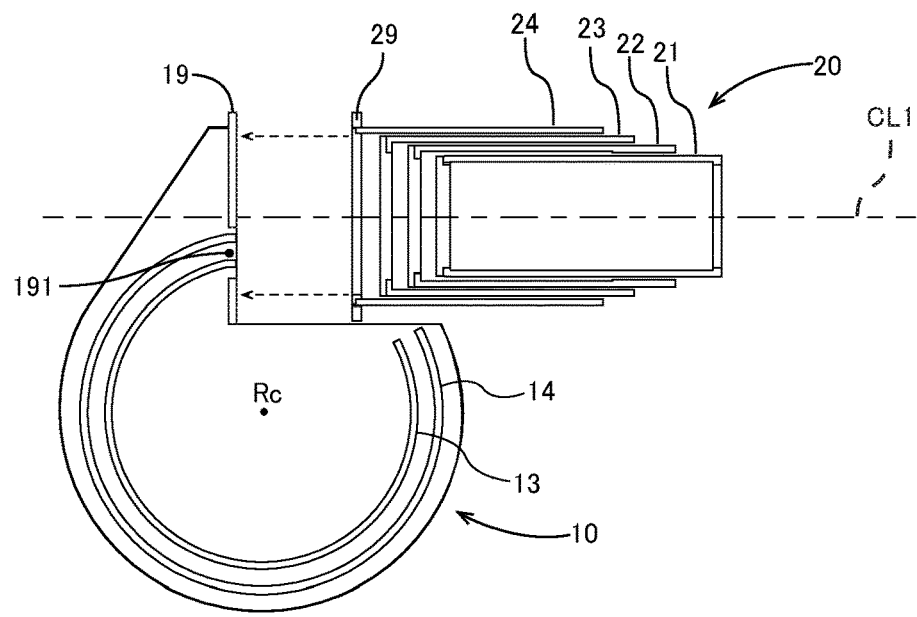
FIG. 3 is a side view showing the linear motion mechanism of FIG. 1 in a state where a housing and a linear motion arm are separated.
Figure 4:
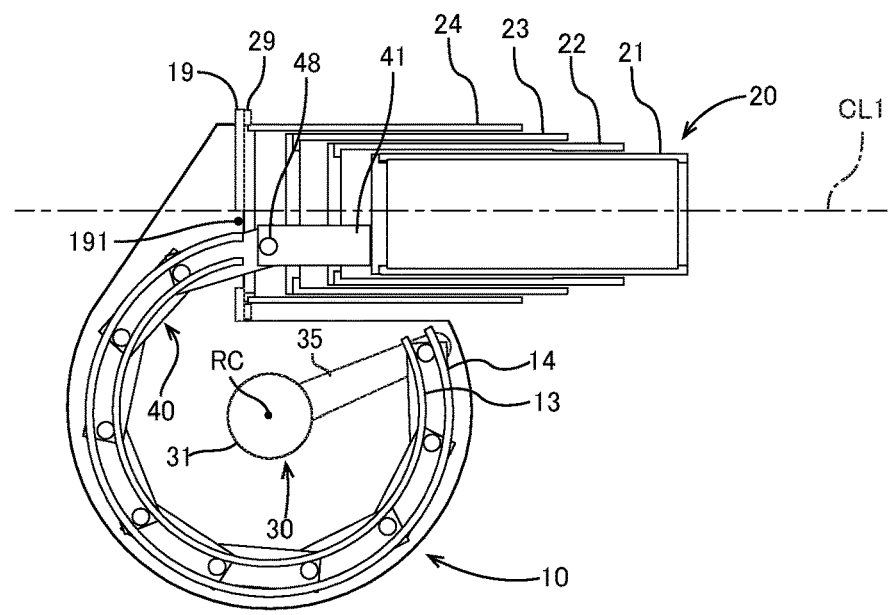
FIG. 4 is a side view showing a basic structure of the linear motion mechanism during contraction.
Figure 5:
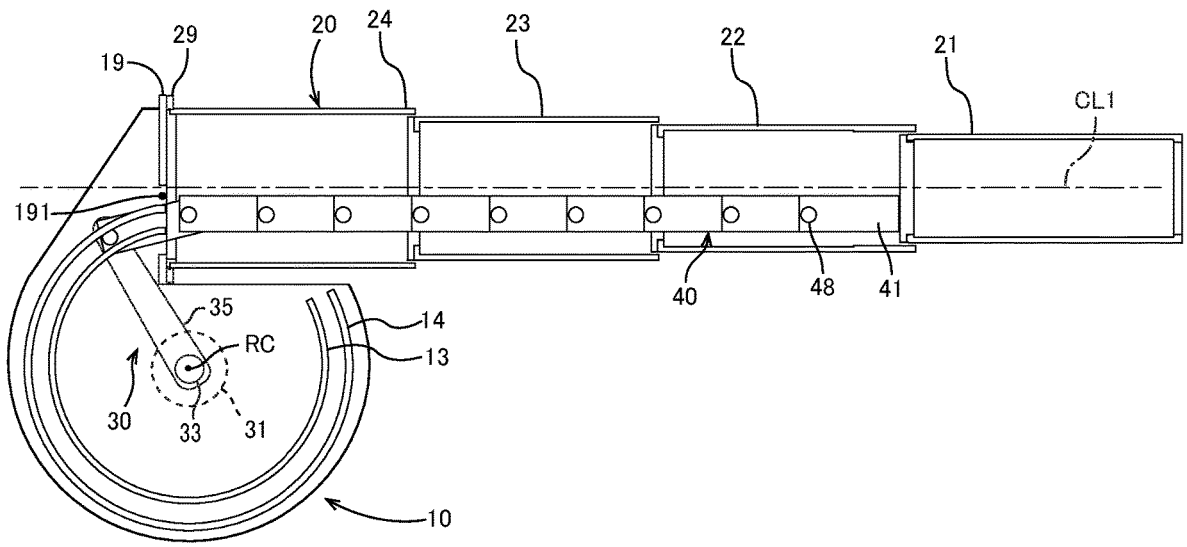
FIG. 5 is a side view showing a basic structure of the linear motion mechanism during extension.

Typically, the housing 10 is configured in a substantially short circular cylindrical shape with approximately a ¼ circle cut out at the top. As shown in FIG. 3, a mount plate 19 is attached to the cut-out portion at the top of the housing 10. A flange 29 formed at the rear end of the linear motion arm 20, that is, the rear edge of the rearmost cylinder 24 is joined to the mount plate 19, and is fastened by bolts or the like. An opening 191 is formed in the mount plate 19. The inside of the housing 10 communicates with the hollow interior of the cylinders 21, 22, 23, 24. As shown in FIGS. 4 and 5, a block row 40 is inserted into an internal space communicating from the inside of the housing 10 to the hollow interior of the cylinders 21, 22, 23, 24. The block row 40 is formed by coupling a plurality of blocks 41 in a row. Typically, the head block 41 of the block row 40 is connected to the frontmost cylinder 21 of the cylinders 21, 22, 23, 24. The connection structure is not limited to this as long as the block row 40 and the linear motion arm 20 are connected to each other and the linear motion arm 20 can be moved forward and backward by feeding and pulling back motions of the block row 40. A block 41 other than the head of the block row 40 may be connected to the linear motion arm 20, or two or more blocks 41 may be connected thereto. Further, a cylinder 22, 23, 24 other than the frontmost cylinder 21 may be connected to the block row 40.

The housing 10 includes therein an accommodating portion for accommodating the block row 40 along an arc trajectory centered on the housing center RC. The accommodating portion has a pair of guide rails 13, 14 for guiding cam followers 48, 49 attached to the block 41 to be described later. The pair of guide rails 13, 14 are respectively provided on the inner surfaces of the side plates on both sides of the housing 10. Typically, the guide rails 13, 14 are each configured as a thin rod body curved in an arc shape, and arranged such that the center of the arc coincides with the housing center RC. The arc radius of each guide rail 13, 14 is determined such that the distance between the guide surface of the outer guide rail 14 and the guide surface of the inner guide rail 13 is slightly larger than the diameter of the cam followers 48, 49.

A drive mechanism 30 that realizes the feeding and pulling back motions of the block row 40 is provided inside the housing 10. The drive mechanism 30 has a plurality of elements for pushing the block row 40 out from the rear and pulling it back from the rear. Specifically, the drive mechanism 30 includes a reduction gear 31 for reducing the rotational speed of a motor (not shown). The reduction gear 31 is arranged so that the rotational center of its rotary shaft 33 coincides with the housing center RC. One end (proximal end) of a rod-shaped rotary arm 35 is connected to the rotary shaft 33 of the reduction gear 31. The other end (distal end) of the rotary arm 35 is connected to the rearmost block 41 of the block row 40.

Figure 6:
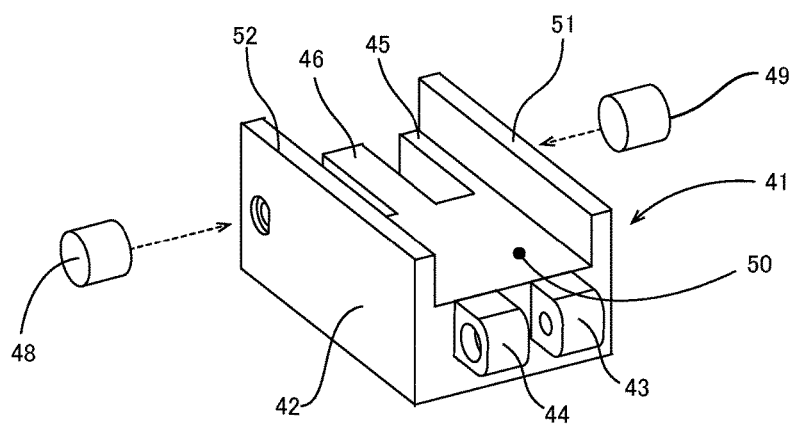
FIG. 6 is a perspective view showing a block in FIG. 5 obliquely from the front.
Figure 7:
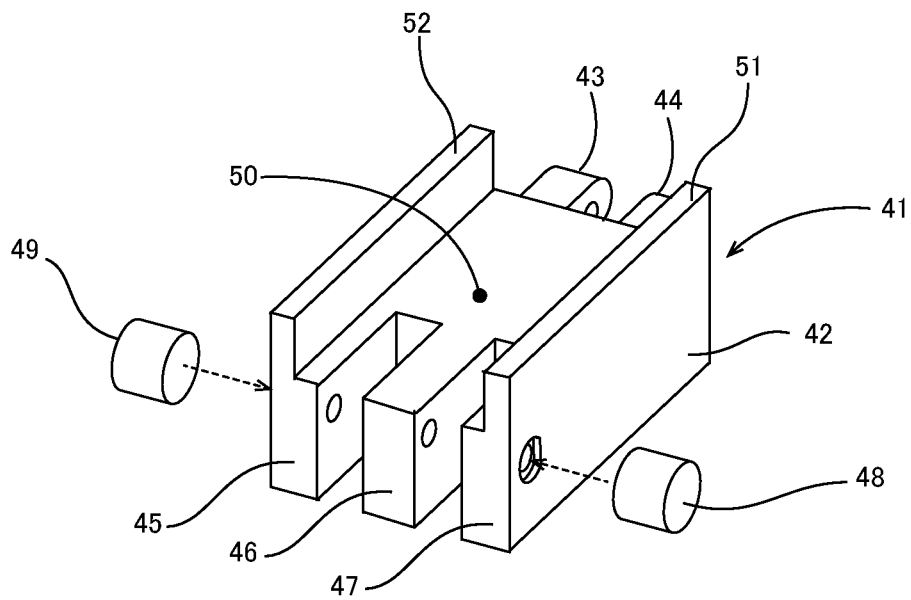
FIG. 7 is a perspective view showing a block in FIG. 5 obliquely from the rear.

As shown in FIGS. 6 and 7, the block 41 has a block body 42. The block body 42 has an elongated rectangular parallelepiped outline. A pair of guide plates 51, 52 are formed integrally with the block body 42 on both side edges of the upper surface of the block body 42 in order to route a wire body 60 to be described below along the upper surface of the block body 42. The wire body 60 is wired on the upper surface of the block body 42 and on a wiring path 50 delimited by the guide plates 51, 52. The shape of the block 41 is not limited to the above as long as the wire body 60 can be routed along the block row 40. For example, the block body 42 may be configured as a cylinder, and the wire body 60 may be wired in its hollow interior penetrating the block body 42 back and forth. A hole penetrating the block body 42 back and forth may be formed in the block body 42, and the wire body 60 may be passed through the hole. In order to wire the wire body 60 on the outer surface of the block body 42, a clamp that movably supports the wire body 60 may be attached.

At the front end of the block body 42, two bearings 43, 44 projecting forward are provided apart from each other in the width direction. At the rear end of the block body 42, bearings 45, 46, 47 integrally formed with the block body 42 are provided apart from each other in the width direction. The bearing 43 at the front end of one block 41 of two adjacent blocks 41 is fitted between bearings 45, 46 at the rear end of the other block 41, the bearing 44 at the front end of one block 41 is fitted between bearings 46, 47 at the rear end of the other block 41, and a coupling shaft (not shown) is inserted into the continuous holes. As a result, the two adjacent blocks 41 are rotatably coupled. The block body 42 is configured such that the end surfaces of two adjacent blocks 41 come into contact with each other with the adjacent blocks 41 linearly arranged, and further upward rotation is restricted while downward rotation is allowed. This allows the rigidity of the block row 40 in a linearly arranged state to be secured, while improving the smoothness of the feeding motion and the pulling back motion of the block row 40.

The cam followers 48 and 49 which roll on the guide rails 13, 14 provided inside the housing 10 are respectively provided on both side surfaces of the block body 42. The cam followers 48 and 49 are positioned with respect to the block body 42 so that the outer ring rotary shaft of the cam follower 48(49) and the coupling shaft for coupling blocks 41 are both arranged on a circle centered on the housing center RC in a side view. Accordingly, the block row 40 is smoothly accommodated in the housing 10 along the arc trajectory by being regulated by the guide rails 13, 14.

The linear motion arm 20 of the linear motion mechanism 1 configured as described above is driven as follows.

As the motor rotates in the forward direction, the distal end of the rotary arm 35 is rotated in the forward direction along an arc trajectory centered on the housing center RC. The rearmost block 41 connected to the distal end of the rotary arm 35 is moved together with the distal end of the rotary arm 35 in a direction (forward direction) approaching the opening 191 along an arc trajectory defined by the guide rails 13, 14. As the rearmost block 41 moves, the blocks 41 are fed, sequentially from the head block 41, from the inside of the housing 10 through the opening 191 to the inside of the linear motion arm 20, and the head block 41 is moved forward along an axis parallel to a cylinder center line CL1 of the linear motion arm 20. The head block 41 is connected to the frontmost cylinder 21. As the head block 41 moves forward, the other cylinders 21, 22, 23 are pulled out one after another from the rearmost cylinder 24 fixed to the housing 10, and as a result, the linear motion arm 20 is extended forward along the cylinder center line CL1.

As the motor rotates in the reverse direction, the distal end of the rotary arm 35 rotates in the reverse direction around the housing center RC. The rearmost block 41 connected to the distal end of the rotary arm 35 is moved together with the distal end of the rotary arm 35 in a direction (reverse direction) away from the opening 191 along the arc trajectory defined by the guide rails 13, 14. As the rearmost block 41 moves, the blocks 41 are pulled back, sequentially from the last block 41, from the inside of the linear motion arm 20 through the opening 191 to the inside of the housing 10, and the head block 41 is moved backward along the axis parallel to the cylinder center line CL1. As the head block 41 moves backward, the cylinders 21 are accommodated in the rear cylinders sequentially from the frontmost cylinder, and as a result, the linear motion arm 20 is contracted backward along the cylinder center line CL1.

Figure 8:
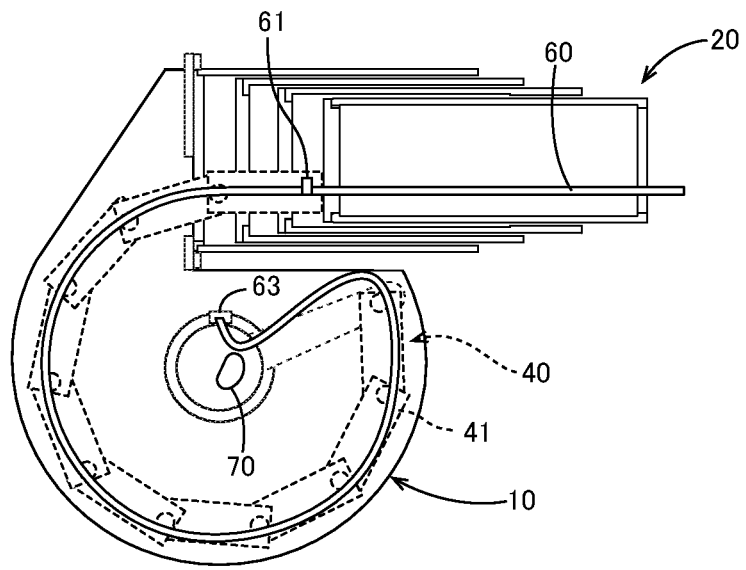
FIG. 8 is a side view showing wiring of a wire body in a state where a block row is most pulled back.
Figure 9:
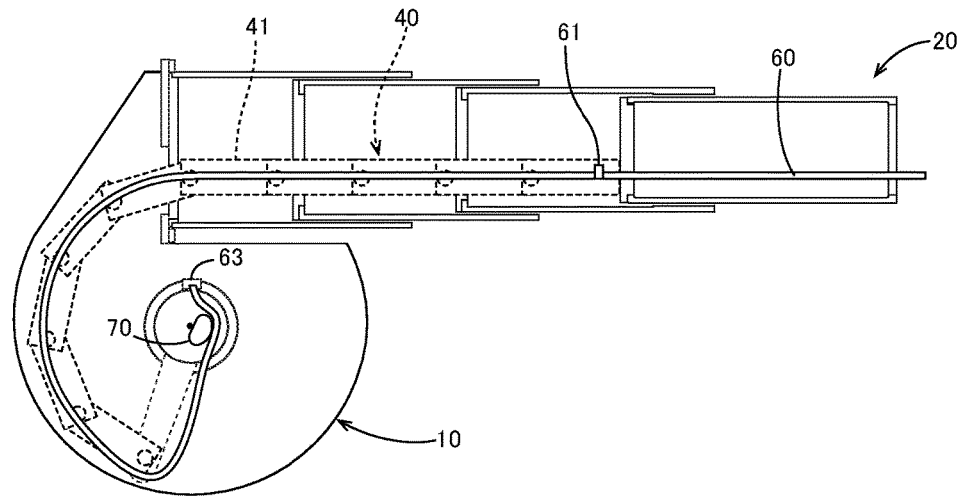
FIG. 9 is a side view showing wiring of the wire body in a state where the block row is slightly fed from the state shown in FIG. 8.
Figure 10:
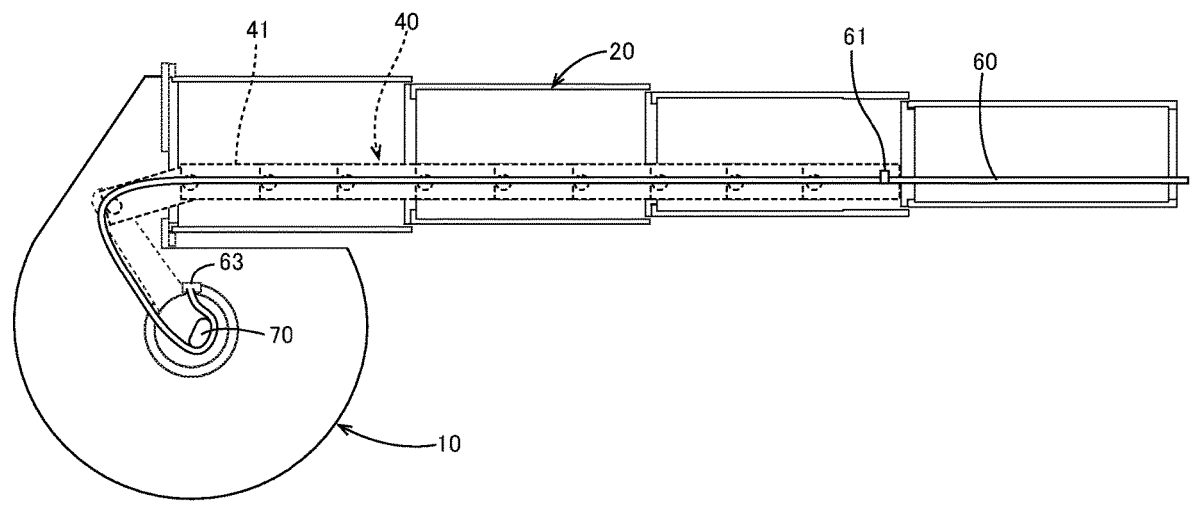
FIG. 10 is a side view showing wiring of the wire body in a state where the block row is most fed.

As shown in FIGS. 8, 9, and 10, the wire body 60, such as a power supply cable, a signal cable, or an air tube, is fixed by a fixture 61 on the front end side at the head block 41 of the block row 40, routed along the block row 40, and fixed by a fixture 63 on the rear end side at a fixing part of the reduction gear 31 inside the housing 10. The fixed position of the wire body 60 is not limited to the above as long as the excess length of the wire body 60 varies as the block row 40 is fed and pulled back. For example, the wire body 60 may be fixed to the frontmost cylinder 21 on the front end side. The fixed position of the wire body 60 is not limited to the inside of the linear motion mechanism 1. For example, the wire body 60 may be fixed outside the housing 10 on the rear end side, or fixed on the front end side at an end effector connected to the linear motion arm 20, the wrist part, or the like.

The wire body 60 is routed along the block row 40. The block row 40 is composed of a straight portion and an arc portion, and the wiring length of the straight portion is shorter than the wiring length of the arc portion. As the block row 40 is fed from the accommodating portion (guide rails 13, 14) and pulled back to the accommodating portion (guide rails 13, 14), the ratio between the straight portion and the arc portion of the block row 40 changes. As a result, the excess length of the wire body 60 varies.

The wiring route of the wire body 60 changes in accordance with a change in the retracted position of the wire body 60 by the rearmost block 41 of the block row 40 with respect to the fixed position on the rear end side of the wire body 60. Since the rearmost block 41 moves along the arc trajectory centered on the housing center RC, the wiring distance from the fixed position on the rear end side of the wire body 60 to the retracted position of the wire body 60 by the rearmost block 41 may vary. For example, when the fixed position on the rear end side of the wire body 60 is provided at a position closer to the retracted position by the rearmost block 41 in the state where the block row 40 is most fed than the retracted position by the rearmost block 41 in the state where the block row 40 is most pulled back, an excess length of the wire body 60 occurs in the state where the block row 40 is most fed. However, by providing the fixed position on the rear end side of the wire body 60 at a position relatively close to the housing center RC, the variation range of the distance between the fixed position on the rear end side of the wire body 60 and the retracted position of the wire body 60 by the rearmost block 41 can be reduced, and even if an excess length of the wire body 60 occurs, the length can be shortened, so that slack of the wire body 60 can be suppressed.

Figure 11:
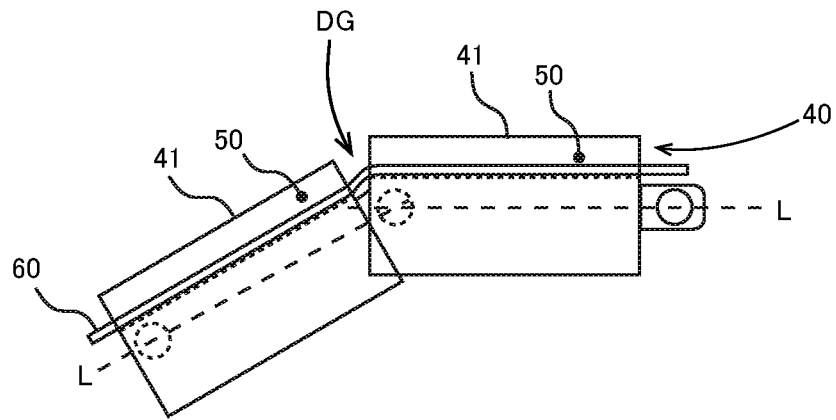
FIG. 11 is a side view showing the wire body wired along the block row arranged in an arc shape.
Figure 12:
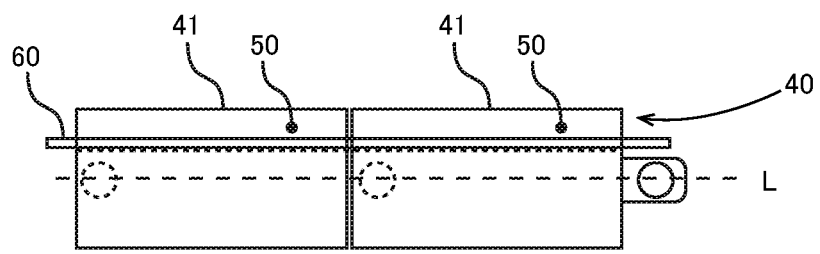
FIG. 12 is a side view showing the wire body wired along the block row arranged linearly.

The wiring route of the wire body 60 changes as the overall shape of the block row 40 changes. As shown in FIG. 11, when the block row 40 is arranged in an arc shape, a gap DG is formed between wiring paths 50 of adjacent blocks 41. On the other hand, as shown in FIG. 12, when the block row 40 is arranged linearly, the gap DG is not formed. Therefore, the wiring route length of the wire body 60 along the block row 40 arranged in an arc shape is longer than the wiring route length of the wire body 60 along the block row 40 arranged linearly. Naturally, the length of the wire body 60 from the fixed position on the front end side to the fixed position on the rear end side of the wire body 60 is determined to be equivalent to or longer than the maximum length of the wiring route of the wire body 60. Therefore, as the number of linearly arranged blocks 41 increases, the wiring route length of the wire body 60 along the block row 40 becomes shorter, which causes an excess length of the wire body 60 and causes slack of the wire body 60 between the fixed position on the rear end side of the wire body 60 and the retracted position by the rearmost block 41.

One feature of the linear motion mechanism 1 according to the present embodiment is that it has a detour member 70 for detouring the wiring route of the wire body 60 as a member for absorbing the excess length of the wire body 60 and suppressing the occurrence of slack of the wire body 60.

Figure 13:
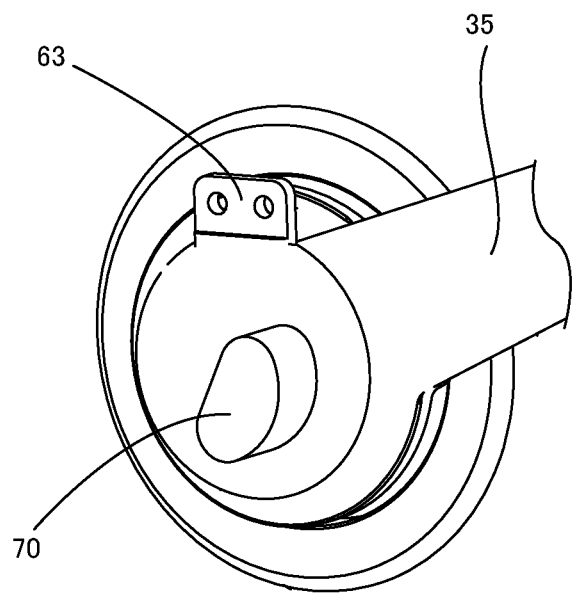
FIG. 13 is a perspective view showing a detour member.

The position and shape of the detour member 70 are determined so that the detour length of the wiring route of the wire body 60 is equivalent to the excess length of the wire body 60. Specifically, as shown in FIG. 13, the detour member 70 is configured as a columnar body having a substantially elliptic bottom surface, and is provided at a position close to the housing center RC. The shape of the detour member 70 is not limited to this. For example, the detour member 70 may have an outer periphery around which the wire body 60 is wound, and the outer periphery may have a substantially circular shape, a shape composed of a plurality of arcs, or a shape composed of a plurality of arcs and straight lines. Further, the detour member 70 does not have to be able to completely absorb the excess length of the wire body 60 as long as slack of the wire body 60 does not occur or slack of the wire body 60 can be kept small. The detour member 70 may be, for example, a thin pin. Further, the number of detour members 70 need not be one, and two or more detour members 70 may be provided.

Figure 14:
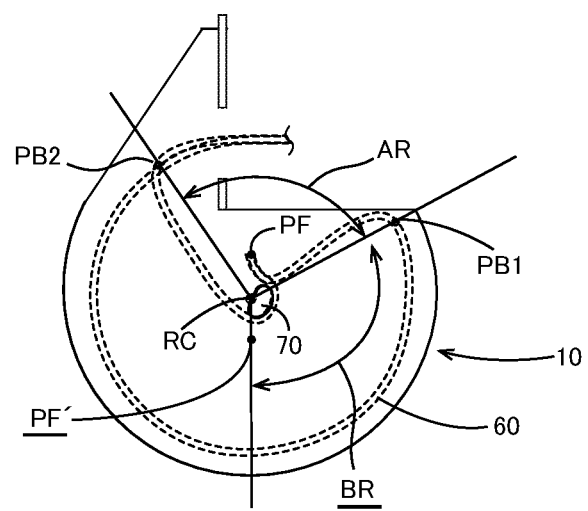
FIG. 14 shows a position on the rear end side at which the wire body is fixed and a position of the detour member.

Typically, the fixed position PF on the rear end side of the wire body 60 and the installation position of the detour member 70 are determined under the following conditions. In FIG. 14, the retracted position of the wire body 60 by the rearmost block 41 in the state where the block row 40 is most pulled back is represented by PB1 (hereinafter referred to as a first retracted position PB1), and the retracted position of the wire body 60 by the rearmost block 41 in the state where the block row 40 is most fed is represented by PB2 (hereinafter referred to as a second retracted position PB2).

As shown in FIG. 14, the fixed position PF on the rear end side of the wire body 60 is displaced from the housing center RC, and is in a range AR between the angle of the second retracted position PB2 and the angle of the first retracted position PB1 around the housing center RC. Further, the fixed position PF on the rear end side of the wire body 60 is provided at a position closer to the second retracted position PB2 than the housing center RC and closer to the second retracted position PB2 than the first retracted position PB1 within the range AR.

Since the fixed position PF on the rear end side of the wire body 60 is displaced from the housing center RC, when the block row 40 is fed from the most pulled back state, the retracted position of the wire body 60 by the rearmost block 41 can be gradually moved away from the fixed position PF on the rear end side of the wire body 60. Therefore, while the excess length of the wire body 60 is small, the excess length of the wire body 60 can be absorbed by a change in the distance between the fixed position PF on the rear end side of the wire body 60 and the retracted position of the wire body 60 by the rearmost block 41 without detouring the wiring route around the detour member 70. This simplifies the shape of the detour member 70 and suppress an increase in size and weight of the detour member 70.

As shown in FIG. 14, the detour member 70 is arranged such that the outer surface around which the wire body 60 is wound is within a range BR around the housing center RC between the angle of the first retracted position PB1 and an angle of a position PF' on the opposite side of the housing center RC to the fixed position PF on the rear end side of the wire body 60. In other words, the detour member 70 is arranged at a position farther from the second retracted position PB2 than the housing center RC, farther from the second retracted position PB2 than the fixed position PF on the rear end side of the wire body 60, and closer to the second retracted position PB2 than the first retracted position PB1.

The detour member 70 described above can absorb the excess length of the wire body 60 as follows. As shown in FIG. 8, in the state where the block row 40 is most pulled back, the excess length of the wire body 60 does not occur. When the block row 40 is fed from the inside of the housing 10 to the inside of the linear motion arm 20 by the drive mechanism 30, an excess length of the wire body 60 occurs. The excess length of the wire body 60 gradually increases as the block row 40 fed to the inside of the linear motion arm 20 becomes longer, that is, as the number of linearly aligned blocks 41 increases. On the other hand, when the block row 40 is fed from the inside of the housing 10 to the inside of the linear motion arm 20 by the drive mechanism 30, the rearmost block 41 is moved in the forward direction along the arc trajectory centered on the housing center RC. As the rearmost block 41 moves in the forward direction, the wire body 60 between the fixed position on the rear end side of the wire body 60 and the retracted position of the wire body 60 by the rearmost block 41 is gradually wound around the detour member 70 and the wiring route of the wire body 60 is detoured. The detour length of the wiring route of the wire body 60 by the detour member 70 gradually increases as the length of the block row 40 fed to the inside of the linear motion arm 20 increases, that is, as the rearmost block 41 is moved in the forward direction along the arc trajectory centered on the housing center RC.

That is, the excess length of the wire body 60 that gradually increases as the length of the block row 40 fed from the inside of the housing 10 to the inside of the linear motion arm 20 increases can be absorbed by the detour length of the wiring route of the wire body 60 by the detour member 70 that gradually increases as the length of the block row 40 fed from the inside of the housing 10 to the inside of the linear motion arm 20 increases, so that the occurrence of slack of the wire body 60 can be suppressed. Moreover, since the detour member 70 can be provided inside the housing 10 near the housing center RC inside the guide rails 13, 14, the housing 10 can be prevented from increasing in size due to the provision of the detour member 70.

The accommodating structure is not limited to that in the present embodiment as long as the block row 40 can be accommodated along the arc trajectory. In the present embodiment, the cam followers 48, 49 attached to the block 41 are regulated by the guide rails 13, 14 provided on the inner surfaces of the side plates on both sides of the housing 10, but the cam followers 48, 49 may be fitted into arc-shaped grooves provided in the inner surface of the housing 10 to be regulated. Further, the block 41 may be directly regulated and accommodated along the arc trajectory without being provided with the cam followers 48, 49. Further, since the variation of the excess length of the wire body 60 is caused only by a change in the retracted position of the wire body 60 by the rearmost block 41 of the block row 40 with respect to the fixed position on the rear end side of the wire body 60, the block row 40 need not be accommodated in the accommodating portion in an arc shape.

As long as the block row 40 can be fed and pulled back, the configuration of the drive mechanism 30 for feeding and pulling back the block row 40 from and to the housing 10 is not limited to that in the present embodiment. In the present embodiment, in order to push out the block row 40 from the housing 10 and pull it back to the housing 10, the distal end of the rotary arm which rotates around the housing center RC is connected to the rearmost block 41 of the block row 40; however, a gear may be formed to extend from the front to the rear of the block 41, and a drive gear that meshes with the gear formed on the block 41 may be arranged on the travel route of the block 41.

The linear motion arm 20 according to the present embodiment is not limited to the one having a telescopic structure. For example, the linear motion arm 20 may be composed of a plurality of cascaded linear motion guide mechanisms. A base supporting a rail of the rearmost linear motion guide mechanism among the plurality of linear motion guide mechanisms is horizontally fixed to the mount plate 19, and the head block 41 of the block row 40 is connected to a slider of the head linear motion guide mechanism. As the block row 40 moves forward and backward, the linear motion arm 20 composed of the plurality of linear motion guide mechanisms is extended and contracted.

The technical idea of providing the detour member to detour the wiring route of the wire body, absorbing the excess length of the wire body with the detour length, and suppressing slack of the wire body is not exclusively applied to the linear motion mechanism 1 according to the present embodiment. For example, even in a configuration in which the retracted position of the wire body into the linear motion arm is largely changed by the motion of the linear motion arm and an excess length of the wire body occurs, the detour member can be used to suppress the occurrence of slack of the wire body.

Figure 15:
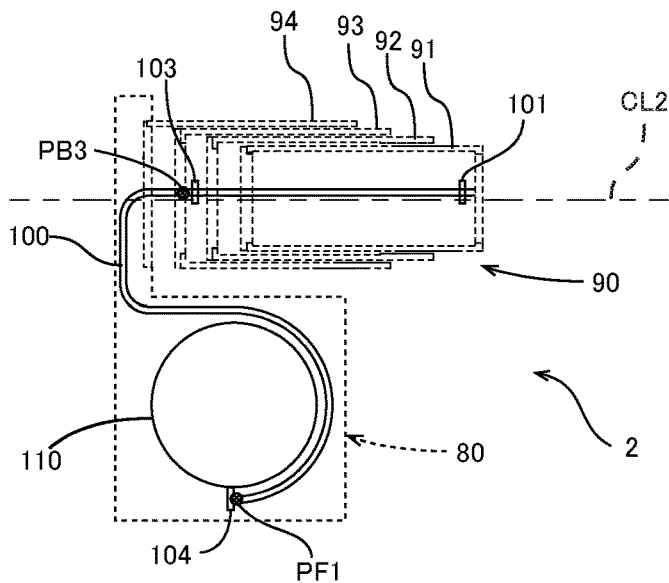
FIG. 15 is a side view of a linear motion mechanism during contraction according to a modification of the embodiment.
Figure 16:
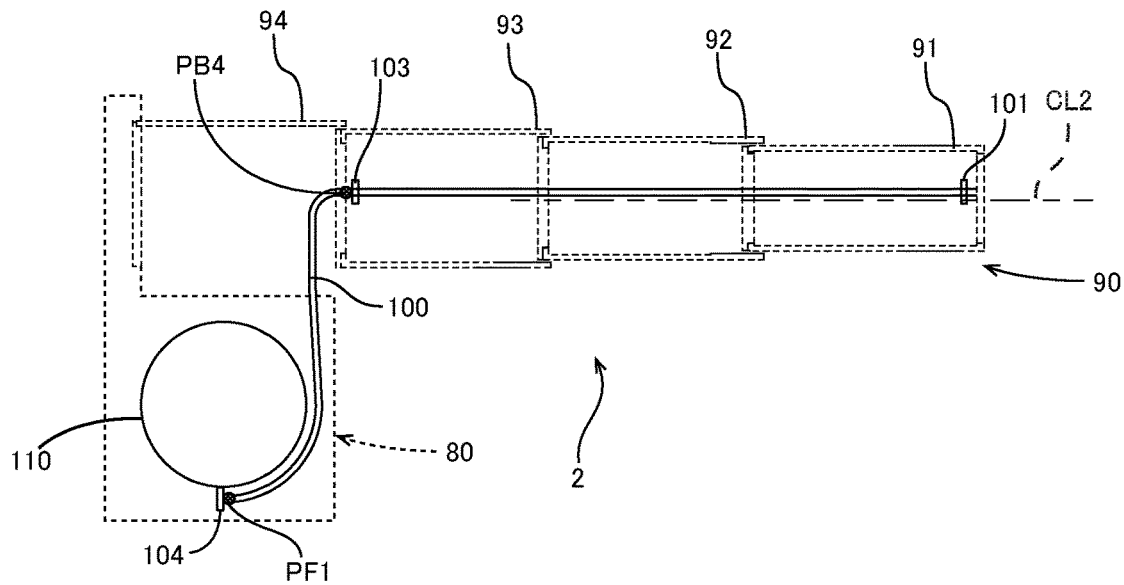
FIG. 16 is a side view of the linear motion mechanism during extension according to the modification of the embodiment.

FIGS. 15 and 16 show a linear motion mechanism 2 according to a modification of the present embodiment. The linear motion mechanism 2 has a linear motion arm 90 (second member) configured in the same manner as the linear motion arm 20 of the linear motion mechanism 1 already described. The linear motion arm 90 is composed of four cylinders 91, 92, 93, 94 assembled in a telescopic structure (multi-stage nested structure). A part of the side wall of the rearmost cylinder 94 is cut out from the front to the back to allow a wire body 100 to pass through. The linear motion arm 90 is supported by a base 80 (first member) at the rear edge of the rearmost cylinder 94. The wire body 100 is fixed on the front end side by a fixture 101 inside the foremost cylinder 91 of the linear motion arm 90, routed along a cylinder center line CL2 of the linear motion arm 90, and fixed on the rear end side to the base 80 by a fixture 104. The wire body 100 is movably supported by a clamp member 103 on the rear end side of the third cylinder 93 from the front among the four cylinders 91, 92, 93, 94. The position on the rear end side of the cylinder 93 at which the clamp member 103 is provided corresponds to the retracted position of the wire body 100 by the linear motion arm 90.

In FIGS. 15 and 16, the retracted position of the wire body 100 by the linear motion arm 90 in the state where the linear motion arm 90 is contracted is represented by PB3, and the retracted position of the wire body 100 by the linear motion arm 90 in the state where the linear motion arm 90 is extended is represented by PB4. As shown in FIGS. 15 and 16, the retracted position of the wire body 100 by the linear motion arm 90 with respect to the fixed position PF1 on the rear end side of the wire body 100 varies greatly as the linear motion arm 90 extends and contracts. In the linear motion mechanism 2, the wiring route length of the wire body 100 becomes maximum when the linear motion arm 90 is extended, and the wiring route length of the wire body 100 becomes minimum when the linear motion arm 90 is contracted. The length of the wire body 100 from the fixed position on the front end side of the wire body 100 to the fixed position on the rear end side thereof is equivalent to or longer than the maximum wiring route length of the wire body 100. Accordingly, as the linear motion arm 90 is contracted from the extended state, the excess length of the wire body 100 gradually increases.

In order to suppress the occurrence of slack due to the excess length of the wire body 100, a detour member 110 for detouring the wiring route of the wire body 100 is provided. The detour member 110 is formed into a columnar body, and arranged between the fixed position on the rear end side of the wire body 100 and the linear motion arm 90. Thus, although the excess length of the wire body 100 gradually increases as the linear motion arm 90 is contracted from the extended state, the wiring route length simultaneously increases as the wiring route of the wire body 100 is detoured around the detour member 110; accordingly, the excess length of the wire body 100 can be wound around and absorbed by the detour member 110. Thus, the linear motion mechanism 2 according to the modification has the same effect as that of the linear motion mechanism 1, and can suppress the occurrence of slack of the wire body 100.

While some embodiments of the present invention have been described, these embodiments have been presented as examples, and are not intended to limit the scope of the invention. These embodiments can be implemented in various other forms, and various omissions, replacements, and changes can be made without departing from the spirit of the invention. These embodiments and their modifications are included in the scope and spirit of the invention and are included in the scope of the claimed inventions and their equivalents.

The invention claimed is:

1. A liner motion mechanism comprising:
    a plurality of linear motion elements assembled telescopically in multiple stages;
    a block row including a plurality of blocks bendably coupled in a row and connected to the linear motion elements;
    an accommodating portion for accommodating the block row;
    a drive mechanism for feeding the block row from the accommodating portion in order to extend the linear motion elements and pulling back the block row to the accommodating portion in order to contract the linear motion elements;
    a wire body wired along the block row; and
    a detour member for detouring a wiring route of the wire body and absorbing an excess length of the wire body which varies as the block row is fed and pulled back,
    wherein:
    the accommodating portion accommodates the block row in an arc shape;
    the wire body is pulled out from a rearmost block of the blocks; and
    a position on a rear end side at which the wire body is fixed is arranged in a range around a center of an arc of the accommodating portion between an angle of a position at which the wire body is pulled out from the rearmost block in a state where the block row is most fed and an angle of a position at which the wire body is pulled out from the rearmost block in a state where the block row is most pulled back.

2. The linear motion mechanism according to claim 1, wherein the wire body is fixed on a front end side to a head block of the block row or a frontmost linear motion element of the linear motion elements, and fixed on a rear end side at a position different from a center of an arc of the accommodating portion.

3. The linear motion mechanism according to claim 1, wherein a head block of the block row is connected to a frontmost linear motion element of the linear motion elements.

4. The linear motion mechanism according to claim 1, wherein
    the detour member is arranged in a range around the center of the arc of the accommodating portion between the angle of the position at which the wire body is pulled out from the rearmost block in the state in which the block row is most pulled back and an angle of a position on an opposite side of the center of the arc to the position on the rear end side at which the wire body is fixed.

5. The linear motion mechanism according to claim 1, wherein the detour member is arranged farther from the position at which the wire body is pulled out from the rearmost block of the blocks in the state where the block row is most fed than the center of the arc and the position on the rear end side at which the wire body is fixed.

6. The linear motion mechanism according to claim 1, wherein the detour member is formed such that a detour length of the wiring route is equivalent to the excess length of the wire body.

7. The linear motion mechanism according to claim 1, wherein
    the detour member has an outer periphery around which the wire body is wound, and
    the outer periphery is configured in a substantially circular shape, a shape composed of a plurality of arcs, or a shape composed of a plurality of arcs and straight lines.

* * * * *